(12) United States Patent
He et al.

(10) Patent No.: US 8,259,928 B2
(45) Date of Patent: Sep. 4, 2012

(54) METHOD AND APPARATUS FOR REDUCING TIMESTAMP NOISE IN AUDIO ECHO CANCELLATION

(75) Inventors: Chao He, Redmond, WA (US); Qin Li, Redmond, WA (US); Wei-ge Chen, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1488 days.

(21) Appl. No.: 11/788,939

(22) Filed: Apr. 23, 2007

(65) Prior Publication Data
US 2008/0259828 A1      Oct. 23, 2008

(51) Int. Cl.
*H04M 9/08* (2006.01)
(52) U.S. Cl. ........... 379/406.09; 379/406.1; 379/406.11; 379/406.13; 381/66; 702/187
(58) Field of Classification Search . 379/406.01–406.15
See application file for complete search history.

(56) References Cited

U.S. PATENT DOCUMENTS

| | | | |
|---|---|---|---|
| 5,329,587 A | 7/1994 | Morgan et al. | |
| 5,546,459 A | 8/1996 | Sih et al. | |
| 5,548,642 A | 8/1996 | Diethorn | |
| 5,706,344 A | 1/1998 | Finn | |
| 6,219,418 B1* | 4/2001 | Eriksson et al. | 379/406.08 |
| 6,324,170 B1 | 11/2001 | McClennon et al. | |
| 6,496,795 B1 | 12/2002 | Malvar | |
| 6,778,671 B1* | 8/2004 | Graumann | 381/66 |
| 6,876,952 B1* | 4/2005 | Kappler et al. | 702/187 |
| 6,912,209 B1 | 6/2005 | Thi et al. | |
| 7,171,003 B1 | 1/2007 | Venkatesh et al. | |
| 2005/0207567 A1 | 9/2005 | Parry et al. | |
| 2007/0165838 A1* | 7/2007 | Li et al. | 379/406.01 |

FOREIGN PATENT DOCUMENTS

| | | |
|---|---|---|
| EP | 1031191 | 8/2006 |
| WO | WO0239709 A1 | 5/2002 |

OTHER PUBLICATIONS

Elliot, Colm, "Stream Synchronization for Voice over IP Conference Bridges", Date: Nov. 2004, http://www.tsp.ece.mcgill.ca/MMSP/Theses/2004/ElliottT2004.pdf.
Valin, Jean Mark, "The Speex Codec Manual", Date: Aug. 12, 2006, http://gillens.us/doc/speex-1.2/manual.pdf.

* cited by examiner

*Primary Examiner* — Yuwen Pan
*Assistant Examiner* — Ibraham Sharifzada
(74) *Attorney, Agent, or Firm* — Mayer & Williams PC

(57) ABSTRACT

A communication end device of a two-way communication system is shown. The device includes an audio signal capture device for capturing local audio to be transmitted to another end device, an audio signal rendering device for playing remote audio received from the other end device, and buffers for buffering the captured and rendered audio signals. The device also includes an audio echo canceller operating to predict echo from the rendered audio signal at a calculated relative offset in the captured audio signal based on an adaptive filter, and subtract the predicted echo from the signal transmitted to the other end device The calculated relative offset that is used by the audio echo canceller for a current signal sample is adjusted if a difference between it and an adjusted relative offset of a preceding sample exceeds a threshold value.

16 Claims, 4 Drawing Sheets

METHOD AND APPARATUS FOR REDUCING TIMESTAMP NOISE IN AUDIO ECHO CANCELLATION

BACKGROUND

Acoustic Echo Cancellation (AEC) is a digital signal processing technology which is used to remove the acoustic echo from a speaker phone in two-way or multi-way communication systems, such as traditional telephone or modern internet audio conversation applications.

FIG. 1 illustrates an example of one end 105 of a typical two-way communication system, which includes a capture stream path and a render stream path for the audio data in the two directions. The other end is exactly the same. In the capture stream path in the figure, an analog to digital (A/D) converter 120 converts the analog sound captured by microphone 110 to digital audio samples continuously at a sampling rate ($fs_{mic}$). The digital audio samples (herein denoted as "mic[n]") are saved in capture buffer 130 sample by sample. The samples are retrieved from capture buffer in frame increments. Finally, samples are processed and sent to the other end.

In the render stream path, the system receives audio samples (labeled "spk[n]" in the figure) from the other end, and places them into a render buffer 140 in periodic frame increments. Then the digital to analog (D/A) converter 150 reads audio samples from the render buffer sample by sample and converts them to analog signal continuously at a sampling rate, $fs_{spk}$. Finally, the analog signal is played by speaker 160.

As already mentioned, the system includes two buffers: the capture buffer 120 and the render buffer 140. They are necessary because in most communication systems samples in buffers are read and written at different paces. For example, the A/D converter 120 outputs audio samples to the capture buffer sample by sample continuously, but the system retrieves audio samples from the capture buffer frame by frame. This buffering introduces delay. For example, a sample generated by the A/D converter will stay in capture buffer for a short period of time before it is read out. A similar thing happens for the render stream as well. As a special case, if samples in buffers are read and written at the same pace, these buffers are not needed. But, the buffers are always needed in practical systems.

In systems such as that depicted by FIG. 1, the near end user's voice is captured by the microphone 110 and sent to the other end. At the same time, the far end user's voice is transmitted through the network to the near end, and played through the speaker 160 or headphone. In this way, both users can hear each other and two-way communication is established. But, a problem occurs if a speaker is used instead of a headphone to play the other end's voice. For example, if the near end user uses a speaker as shown in FIG. 1, his microphone captures not only his voice (labeled as voice(t)) but also an echo of the sound played from his or her speaker (labeled as "echo(t)"). In this case, the mic[n] signal that is sent to the far end user includes an echo of the far end user's voice. As the result, the far end user would hear a delayed echo of his or her voice, which is likely to cause annoyance and provide a poor user experience to that user.

Practically, the echo echo(t) can be represented by speaker signal spk(t) convolved by a linear response g(t) (assuming the room can be approximately modeled as a finite duration linear plant) as per the following equation:

$$\text{echo}(t) = spk(t) * g(t) = \int_0^{T_e} g(\tau) \cdot spk(t-\tau) d\tau \quad (1)$$

where * means convolution, $T_e$ is the echo length or filter length of the room response.

In order to remove the echo for the remote user, AEC 215 is added to the end 100 of the system shown in FIG. 2. When a frame of samples in the mic[n] signal is retrieved from the capture buffer 130, they are sent to the AEC 215. At the same time, when a frame of samples in the spk[n] signal is sent to the render buffer 140, they are also sent to the AEC 210. The AEC 210 uses the spk[n] signal from the far end to predict the echo in the captured mic[n] signal. Then, the AEC 210 subtracts the predicted echo from the mic[n] signal. This residual is the clear voice signal (voice[n]), which is theoretically echo free and very close to near end user's voice (voice(t)).

FIG. 3 depicts an implementation of the AEC 210 based on an adaptive filter 310. The AEC 210 takes two inputs, the mic[n] and spk[n] signals. It uses the spk[n] signal to predict the echo in the mic[n] signal. The prediction residual (difference of the actual mic[n] signal from the prediction based on spk[n]) is the voice[n] signal, which will be output as echo free voice and sent to the far end.

The actual room response (that is represented as g(t) in the above convolution equation) usually varies with time, such as due to change in position of the microphone 110 or speaker 160, body movement of the near end user, a volume change in the microphone of the speaker and even room temperature. The room response therefore cannot be pre-determined, and must be calculated adaptively at running time. The AEC 210 commonly is based on adaptive filters such as the Least Mean Square (LMS) adaptive filter 310 of FIG. 3, which can adaptively model the varying room response.

SUMMARY

The following Detailed Description presents various ways to enhance AEC quality and robustness in two-way communication systems. In particular, an AEC implementation is described that more accurately aligns the microphone and speaker signals (i.e., aligns the speaker signal samples from which the echo in the current microphone signal sample is predicted) to account for glitches, clock drift and clipping that could otherwise cause poor AEC quality.

In one described AEC implementation, the AEC aligns the microphone and speaker signals based on calculation of a relative sample offset of the signals. In some cases noise may arise in the relative sample offset from a variety of causes. The noise may be removed by a low pass filter. However, in some cases, such as when the noise contains patterns, especially periodic patterns, a low pass filter cannot entirely eliminate the noise from the relative sample offset in an efficient manner. As a result, the quality of the AEC process may not be satisfactory. To remove the inconsistencies in the relative sample offset which arise from noise that is not removed by the low pass filter, a post-processing method is used. The method establishes a threshold that is applied to the filtered relative sample offset. If the noise is lower than the threshold, the relative sample offset of the previous sample is used.

This Summary is provided to introduce a selection of concepts in a simplified form that is further described below in the Detailed Description. This summary is not intended to identify key features or essential features of the claimed subject matter, nor is it intended to be used as an aid in determining the scope of the claimed subject matter. Additional features and advantages of the invention will be made apparent from the following detailed description of embodiments that proceeds with reference to the accompanying drawings.

DETAILED DESCRIPTION

The following description relates to implementations of audio echo cancellation having improved robustness and quality, and their application in two-way audio/voice communication systems (e.g., traditional or internet-based telephony, voice chat, and other two-way audio/voice communications). Although the following description illustrates the inventive audio echo cancellation in the context of an internet-based voice telephony, it should be understood that this approach also can be applied to other two-way or multi-way audio communication systems and like applications.

Quality Issues in Audio Echo Cancellation

Figure 3:
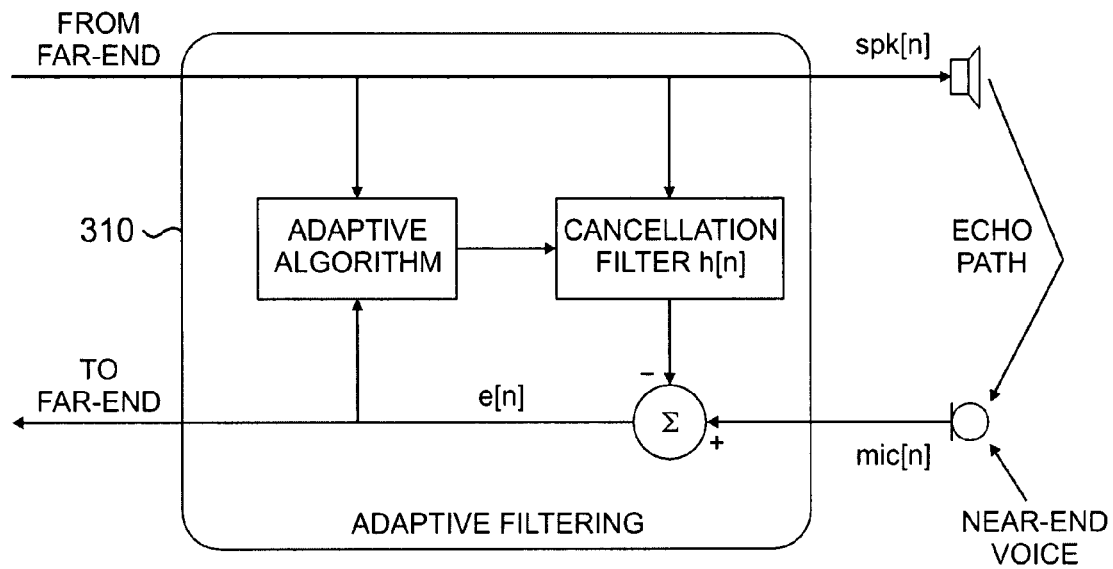
FIG. 3 is a block diagram of an implementation of audio echo cancellation based on an adaptive filter.
Figure 4:
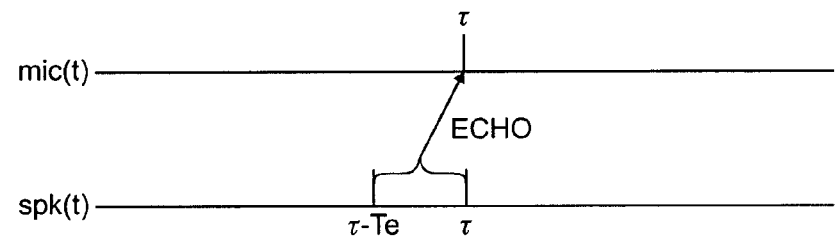
FIG. 4 is a continuous time line illustrating the relationship of the microphone and speaker signals in the echo prediction.

One important piece of information that the AEC 210 (FIG. 3) needs to know for the prediction is the corresponding relationship between samples in the microphone signal mic[n] and the speaker signal spk[n]. Basically, the AEC 210 needs to know which samples in the speaker signal spk[n] are needed to predict the echo at a given sample in the microphone signal mic[n], so that it can cancel the echo. In continuous time, the above equation (1) shows that we can use the speaker signal in time range of [t-$T_e$,t] to predict echo at time t. FIG. 4 illustrates the relationship between the microphone signal sample mic(t) and the speaker signal samples spk(t) from on a continuous time line.

The AEC 210 works with discrete time signals (i.e., mic[n] and spk[n]), and needs to determine which samples in the speaker signal (spk[n]) stream contribute to the echo at a particular sample (mic[i]) in the microphone signal. However, in practice, the AEC 210 operates on two streams of microphone and speaker samples, which generally are sampled by two different sampling clocks and may each be subject to delays. Accordingly, the same indices in the two streams may not be necessarily aligned in physical time.

One way to address this issue is shown in co-pending U.S. application Ser. No. 11/332,500, filed Jan. 12, 2006. This reference introduces an important quantity d[i], which indicates a relative sample offset (i.e. the difference in position between samples in two streams which correspond to the same physical time) between the two streams.

Figure 1:
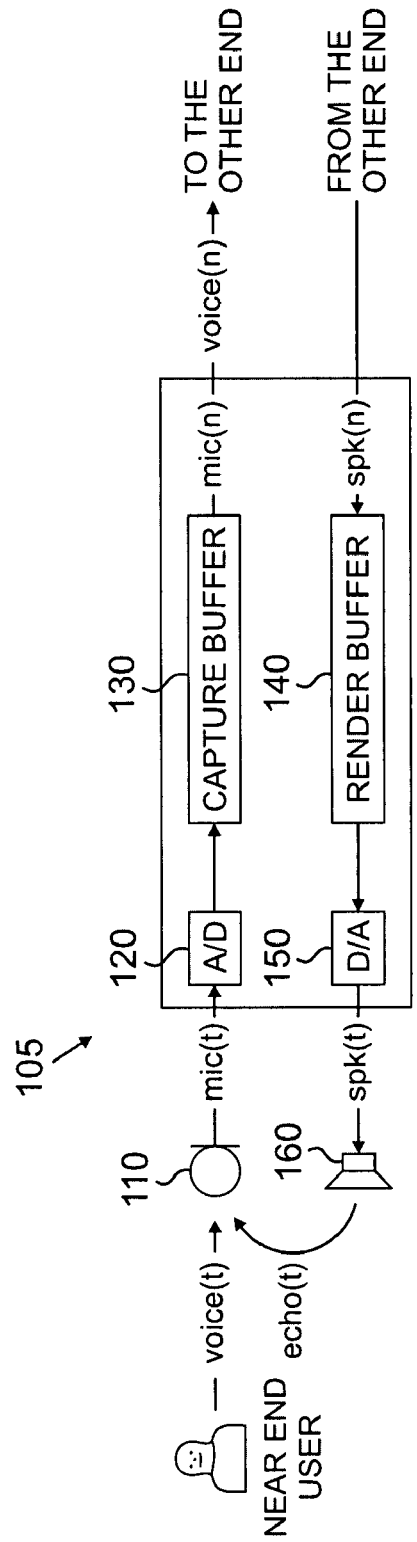
FIG. 1 is a block diagram illustrating one end of a typical two-way communication system.
Figure 2:
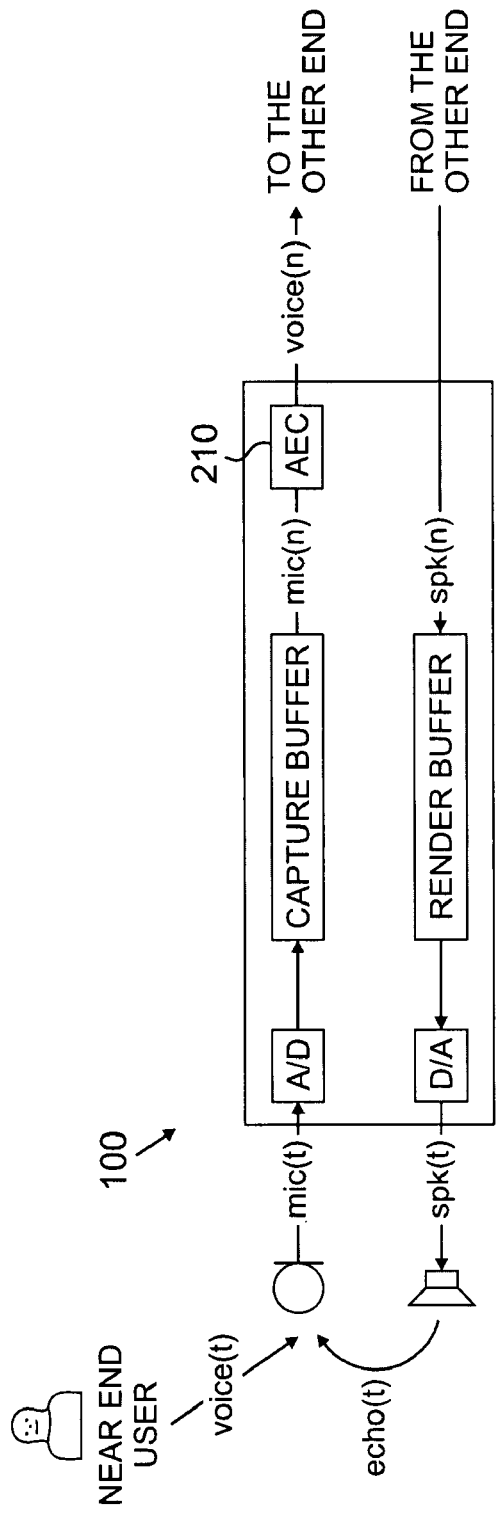
FIG. 2 is a block diagram of the two-way communication system of FIG. 1 with audio echo cancellation.

Conceptually, the relative sample offset d[i] is computed as follows:

1. Given a microphone signal sample mic[i], we first need to find when mic[i] was generated by the A/D converter 120 (FIG. 1). Suppose, it is time τ. So, at time τ, the A/D converter digitizes mic(τ) to mic[i].
2. According to equation (1), we know the echo at mic(τ) is from spk(t) during a short time interval t=[τ-$T_e$,τ] preceding the time τ.
3. Next, the AEC finds which samples in the digital stream of the speaker signal spk[n] are in the time range of [τ-$T_e$,τ]. Assume, the AEC finds an index j of speaker stream such that spk[j] is played back at time τ at the speaker, then we can define the relative sample offset as a difference of the indices, or d[i]=i-j. In other words, the AEC finds a sample spk[j] in the speaker signal stream that is rendered at the same time as the microphone signal sample mic[i] is captured. The index difference between these two samples is the relative sample offset d[i] between the streams at time τ.

Figure 5:
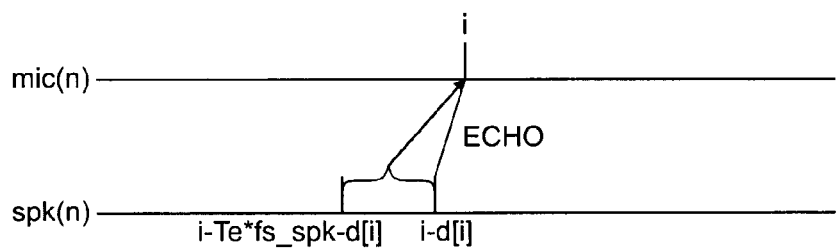
FIG. 5 is a continuous time line illustrating the relationship of the microphone and speaker signals in the echo prediction.

FIG. 5 illustrates the role that the relative sample offset d[i] has to the relationship of the microphone signal sample mic[i] to the speaker signal samples spk[n] from which the echo at mic[i] was introduced. As shown in this time line, the echo at mic[i] comes from the spk[n] samples within the interval (i-$T_e f_s$-d[i]) to (i-d[i]). In the ideal scenario, d[i] could be 0 or a constant. However, in reality the relative sample offset is not because of following two reasons.

(1) There is a delay in the streaming paths for both capturing and playback. The latest microphone samples that enter the AEC computation were actually captured some time ago; and similarly the latest speaker samples sent to the render device will be rendered some time later.

(2) When capture and render clocks run on different crystals, the microphone signal and speaker signal may be captured and rendered at different actual clock frequencies even though their nominal frequencies are the same. In other words, the sampling rates on the capture and render devices may be slightly different. This phenomenon is usually referred to as clock drifting. So, the two streams might lose alignment even if they are aligned at the beginning.

If the precise sampling rates ($fs_{mic}$ and $fs_{spk}$) of the microphone and speaker signals are known, the relative sample offset d[i] can be calculated as a linear function of i:

$$d[i]=(fs_{mic}-fs_{spk})/fs_{mic} \times i-C \qquad (2)$$

where C is a constant related to the initial buffer fullness when the two-way communication system starts up.

In practical systems, the precise sampling rates ($fs_{mic}$ and $fs_{spk}$) can not be directly known. Fortunately, the programming interface (API) of modern audio hardware provides information of the buffer fullness, streaming position, timestamp information or other equivalent information, which can establish the relationship between mic[t] and mic[n], and between spk[t] and spk[n]. Similarly, we can use the three steps we described above to compute the relative sample offset d[i].

The real value of the relative sample offset d[i] is a noisy linear line with occasional jumps due to the following additional two reasons:

(3) Buffer fullness, streaming position or timestamp measurement can not be noise free.

(4) A glitch may happen. When a glitch happens, the system may lose some microphone samples or cause more delays in playback. So, even if samples are aligned at the beginning, they will no longer be aligned after glitches occur.

Figure 6:
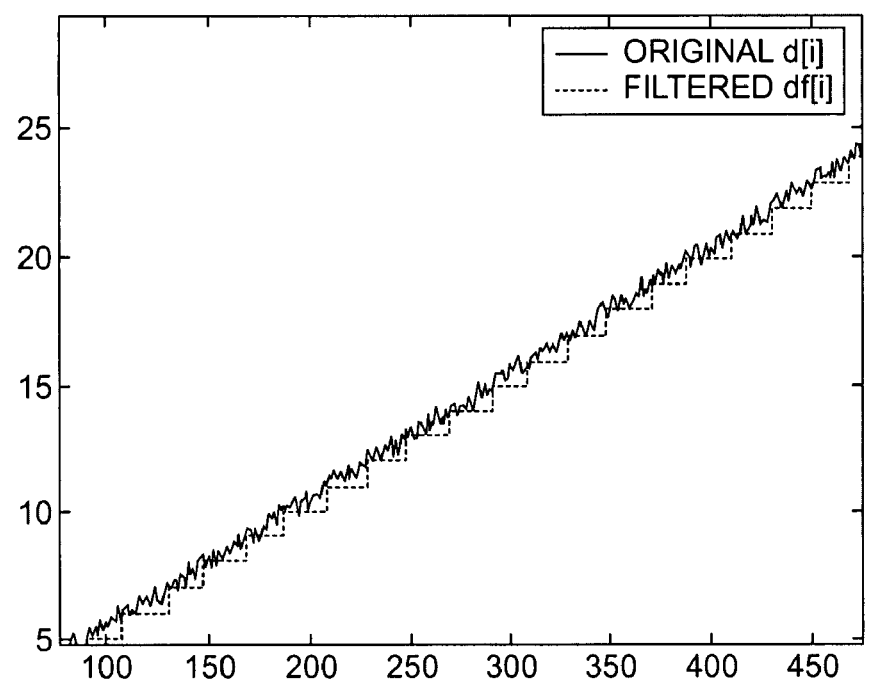
FIG. 6 is a graph of the relative sample offset over time before and after it has been filtered by a low pass filter.

As we can see, due to the aforementioned reasons (1) through (4), a graph of the relative sample offset d[i] over time produces a noisy, linearly increasing line with occasional jumps. This is shown by the curve representing the original relative sample offset d[i] depicted in FIG. 6. These imperfections introduce quality problems for the AEC. In some cases, the variability of d[i] could cause the AEC to fail completely.

Relative Sample Offset Calculation

It should be noted that there are several equivalent ways to calculate the relative sample offset. For example, the relative sample offset can be readily calculated from information on the streaming position, buffer fullness and timestamp of the signal streams. Basically, the AEC implementation denotes the relative sample offset as a function of frame number (d[i]). In the general case, the timestamp is a function of sample position, and can alternatively be used. In an AEC implementation where the frame size is fixed, the frame number can be used. As previously noted, ideally, a graph of the relative sample offset should be just a flat straight line. However, the offset in reality is not constant due to at least the following three reasons.

First, there could be clock drifting. Clock drifting causes the relative sample offset graph to form an inclined line (i.e., the relative sample offset has a non-zero slope). Clock drifting refers to a scenario where the render and capture signals are sampled at different clock rates (frequencies). This may be caused by capture and render devices being on different cards (using different crystals), or it may be caused by an imperfect sampling rate converter in the audio device driver or the audio mixer. The drifting rate is a non-dimensional ratio to describe a time difference between two clocks in a unit time period.

Second, when a glitch happens in one stream, then the relative sample offset will have a discontinuity. The speaker or microphone buffers can be adjusted accordingly in the AEC to re-align the two streams.

Third, in reality, the relative sample offset d[i] may have noise. The noise may be caused by limited numerical precision, data transfer delay, multi-threading, unavailability of certain information, and etc. For instance, in practice timestamps always contain noise. The noise is normally random. In some cases, the noise may show some patterns, but they are still unpredictable. The aforementioned patent application applies a low pass filter to remove this noise and the output is df[q]. In many scenarios, the low pass filter is very effective in reducing or eliminating the noise. That is, the low pass filter can often smooth out the noise in the relative sample offset d[i] so that the AEC is provided with reliable and accurate sample pairs from microphone stream mic[n] and speaker stream spk[n]. Since the samples in both the capture and render streams are discrete time signals, d[i] is usually rounded into an integer value after it has been filtered by the low pass filter. Accordingly, the final relative sample offset df[i] after filtering is represented by filtered relative sample offset curve depicted in FIG. 6. As this curve shows, the relative sample offset df[i] increases with a constant slope in a consistent way. This offset indicates that after the AEC has processed a couple of frames or samples, a one sample adjustment is applied to one of the streams so that they are once again synchronized. This adjustment is repeated periodically after a couple more frames or samples have been processed. Ideally, this is the manner in which the AEC would use the relative sample offset df[i] to ensure that the speaker signal samples spk[n], which are used to predict the echo, are properly aligned with the current microphone signal sample mic[n].

Figure 7:
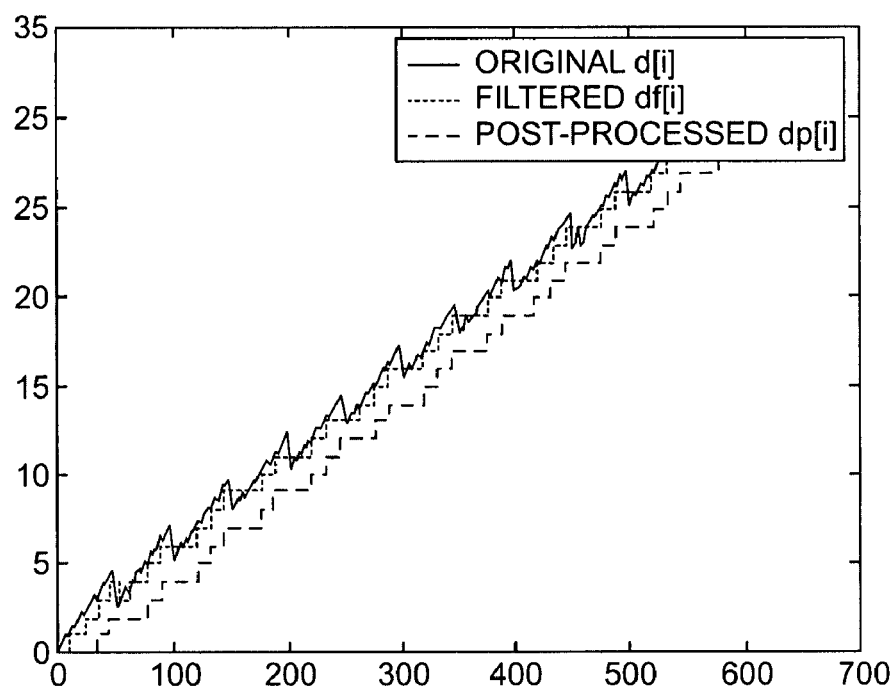
FIG. 7 is a graph of the relative sample offset over time before and after filtering and after it has undergone post-processing in accordance with the techniques described herein.

However, in some cases, such as when the timestamp noise contains patterns, especially periodic patterns, a low pass filter cannot entirely eliminate the noise from the relative sample offset df[i] in an efficient manner. As the result, the quality of the AEC process may not be satisfactory. The curve denoted original d[i] in FIG. 7 shows an example of the relative sample offset df[i] with a periodic noise pattern superimposed on it. Likewise, the curve denoted the filtered sample offset d[i] in FIG. 7 shows the relative sample offset df[i] after it has been filtered with a loss pass filter. As can be seen, at a couple of different times the relative sample offset df[i] exhibits a sharp decrease in value, which is inconsistent with its overall increasing trend. Such inconsistencies can cause the AEC to fail since the error in the relative sample offset df[i] will cause the speaker signal sample spk[n] to be misaligned with the current microphone signal sample mic [n].

To remove the inconsistencies in the relative sample offset df[i] which arise from noise that is not removed by the low pass filter, a post-processing method is used. The method establishes a threshold that is applied to the filtered relative sample offset df[i]. If the noise is lower than the threshold, the relative sample offset df[i] of the previous sample df[i−1] is used. In particular, a new relative sample offset dp[i] is derived from df[i]. The method may be succinctly presented in pseudo code as follows:

```
dp[1] = df[1];
for i=2:N
    If (df[i]−dp[i−1]>Threshold)
        dp[i]=df[i]−Threshold;
    else if (df[i]−dp[i−1] < −Threshold)
        dp[i]=df[i]+Threshold;
    else
        dp[i]=dp[i−1];
    end
end
```

In other words, the first value of the relative sample offset, dp[1], is initialized as df[1]. Then we move forward by one sample and compare the current value of the relative sample offset dq[i] with the previous value dp[i−1]. If they differ by less than a threshold amount, dp[i] is set equal to dp[i−1]. If they differ by more than the threshold amount, dp[i] is updated so that difference between df[i] and dp[i] is equal to the threshold amount. This post-processed relative sample offset dp[i] is also depicted in the FIG. 7.

The threshold can be determined empirically or by any other appropriate method. In general it should be set as the minimum value which can ensure that the post-processed values of the relative sample offset dp[i] trends in a single direction.

Computing Environment

The above-described robust, high quality AEC digital signal processing techniques can be realized on any of a variety of two-way communication systems, including among other examples, computers; speaker telephones; two-way radio; game consoles; conferencing equipment; and etc. The AEC digital signal processing techniques can be implemented in hardware circuitry, in firmware controlling audio digital signal processing hardware, as well as in communication software executing within a computer or other computing environment, such as shown in FIG. 8.

Figure 8:
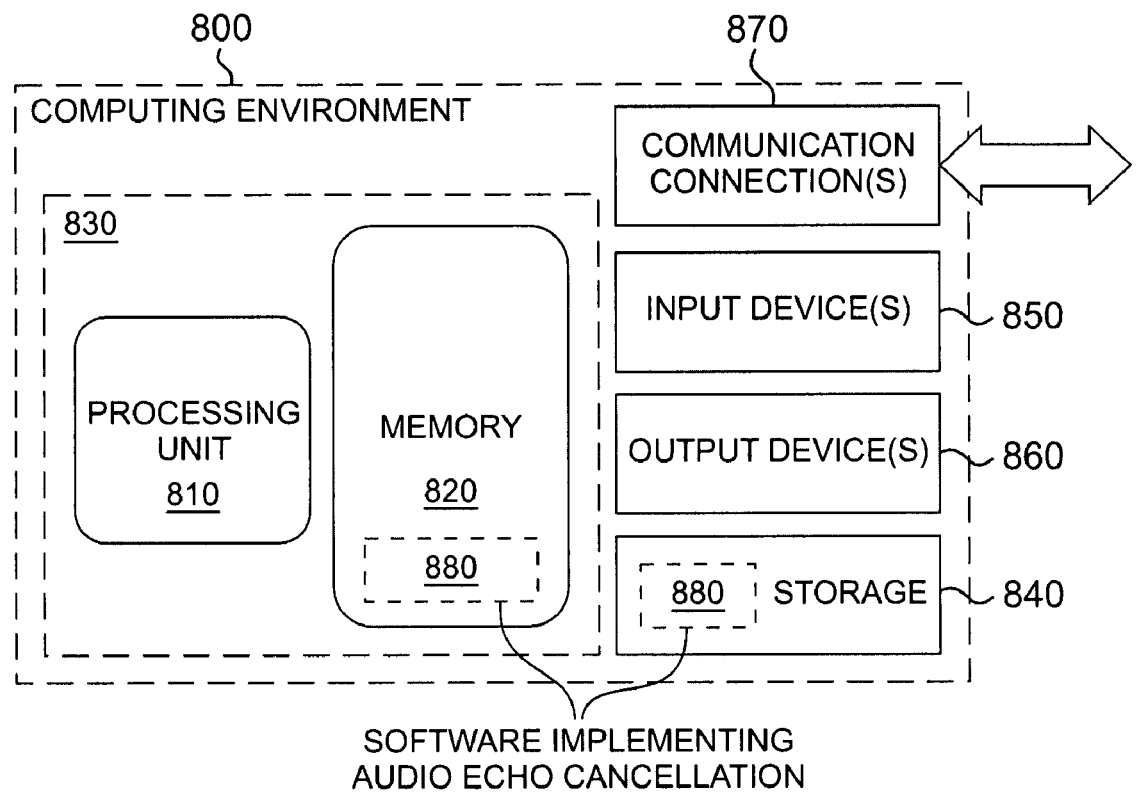
FIG. 8 is a block diagram of a suitable computing environment for implementing a two-way communication system utilizing the AEC implementation having improved robustness and quality.

FIG. 8 illustrates a generalized example of a suitable computing environment (800) in which described embodiments may be implemented. The computing environment (800) is not intended to suggest any limitation as to scope of use or functionality of the described embodiments, as the present invention may be implemented in diverse general-purpose or special-purpose computing environments.

With reference to FIG. 8, the computing environment (800) includes at least one processing unit (810) and memory (820). In FIG. 8, this most basic configuration (830) is included within a dashed line. The processing unit (810) executes computer-executable instructions and may be a real or a virtual processor. In a multi-processing system, multiple processing units execute computer-executable instructions to increase processing power. The memory (820) may be volatile memory (e.g., registers, cache, RAM), non-volatile memory (e.g., ROM, EEPROM, flash memory, etc.), or some combination of the two. The memory (820) stores software (880) implementing the described audio digital signal processing for robust and high quality AEC.

A computing environment may have additional features. For example, the computing environment (800) includes storage (840), one or more input devices (850), one or more output devices (860), and one or more communication connections (870). An interconnection mechanism (not shown) such as a bus, controller, or network interconnects the components of the computing environment (800). Typically, operating system software (not shown) provides an operating environment for other software executing in the computing environment (800), and coordinates activities of the components of the computing environment (800).

The storage (840) may be removable or non-removable, and includes magnetic disks, magnetic tapes or cassettes, CD-ROMs, CD-RWs, DVDs, or any other medium which can be used to store information and which can be accessed within the computing environment (800). The storage (840) stores instructions for the software (880) implementing the described audio digital signal processing for robust and high quality AEC.

The input device(s) (850) may be a touch input device such as a keyboard, mouse, pen, or trackball, a voice input device, a scanning device, or another device that provides input to the computing environment (800). For audio, the input device(s) (850) may be a sound card or similar device that accepts audio input in analog or digital form, or a CD-ROM reader that provides audio samples to the computing environment. The output device(s) (860) may be a display, printer, speaker, CD-writer, or another device that provides output from the computing environment (800).

The communication connection(s) (870) enable communication over a communication medium to another computing entity. The communication medium conveys information such as computer-executable instructions, compressed audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The described audio digital signal processing for robust and high quality AEC techniques herein can be described in the general context of computer-readable media. Computer-readable media are any available media that can be accessed within a computing environment. By way of example, and not limitation, with the computing environment (800), computer-readable media include memory (820), storage (840), communication media, and combinations of any of the above.

The described audio digital signal processing for robust and high quality AEC techniques herein can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "determine," "generate," "adjust," and "apply" to describe computer operations in a computing environment. These terms are high-level abstractions for operations performed by a computer, and should not be confused with acts performed by a human being. The actual computer operations corresponding to these terms vary depending on implementation.

In view of the many possible embodiments to which the principles of our invention may be applied, we claim as our invention all such embodiments as may come within the scope and spirit of the following claims and equivalents thereto.

We claim:

1. A method of processing a digital signal for enhancing audio echo cancellation in a two-way communication system, wherein the audio echo cancellation predicts echo from a rendered signal in a captured signal based on an adaptive filter, the method comprising:
   calculating a relative offset for aligning a sample of the rendered signal with a sample of the captured signal;
   applying a filter to effect smoothing of the relative offset;
   adjusting the relative offset of a current signal sample if a difference between it and an adjusted relative offset of a preceding sample exceeds a threshold value, wherein the threshold value is selected so that the adjusted relative offset changes over time in a single direction;
   predicting an echo with an adaptive filter by using the adjusted relative offset of the current signal sample to align the rendered signal with the captured signal; and
   subtracting the predicted echo from a signal to be transmitted to a remote end device, wherein, if a difference between the relative offset of the current signal sample and the adjusted relative offset of the preceding sample exceeds the threshold value, adjusting the relative offset of the current signal sample by adding the threshold value to or subtracting the threshold value from the relative offset of the current signal sample so that a difference between the relative offset and the adjusted relative offset of the current signal sample is less than the threshold value.

2. The method of claim 1 wherein the adjusted relative offset of the current signal sample is determined by subtracting the threshold value from the relative offset of the current signal sample.

3. The method of claim 1 wherein if a difference between the relative offset of the current signal sample and the adjusted relative offset of the preceding sample does not exceed the threshold value, setting the adjusted relative offset of the current signal sample to the adjusted relative offset of the preceding sample.

4. The method of claim 1 wherein calculating the relative offset is performed using timestamps in the rendered and captured streams.

5. The method of claim 1 wherein calculating the relative offset is performed using numbers identifying samples in the rendered and captured streams.

6. The method of claim 1 wherein adjustment of the relative offset of the current signal sample is performed to at least in part compensate for periodic noise that is not filtered.

7. The method of claim 4 wherein adjustment of the relative offset of the current signal sample is performed to at least in part compensate for noise arising in the timestamps.

8. A communication end device of a two-way communication system, the device comprising:
   an audio signal capture device for capturing local audio to be transmitted to another end device;
   an audio signal rendering device for playing remote audio received from the other end device;
   buffers for buffering the captured and rendered audio signals;
   an audio echo canceller operating to predict echo from the rendered audio signal at a calculated relative offset in the captured audio signal based on an adaptive filter, and subtract the predicted echo from the signal transmitted to the other end device; and
   wherein the calculated relative offset that is used by the audio echo canceller for a current signal sample is adjusted if a difference between it and an adjusted relative offset of a preceding sample exceeds a threshold value, wherein the threshold value is selected so that the adjusted relative offset changes over time in a single direction, wherein if a difference between the relative offset of the current signal sample and the adjusted relative offset of the preceding sample does not exceed the threshold value, setting the adjusted related offset of the current signal sample to the adjusted relative offset of the previous sample.

9. The communication end device of claim 8 wherein the audio echo canceller includes a filter for smoothing the calculated relative offset prior to adjustment.

10. The communication end device of claim 8 wherein the adjusted relative offset of the current signal sample is determined by subtracting the threshold value from the relative offset of the current signal sample.

11. The communication end device of claim 10 wherein, if a difference between the relative offset of the current signal sample and the adjusted relative offset of the preceding sample exceeds the threshold value, adjusting the relative offset of the current signal sample by adding the threshold value to or subtracting the threshold value from the relative offset of the current signal sample so that the difference between the relative offset and the adjusted relative offset of the current sample is less than the threshold value.

12. The communication end device of claim 8 wherein the audio echo canceller calculates the calculated relative offset using timestamps in the rendered and captured streams.

13. The communication end device of claim 8 wherein the audio echo canceller calculates the calculated relative offset using a sample number of samples in the rendered and captured streams.

14. The communication end device of claim 9 wherein adjustment of the relative offset of the current signal sample is performed to at least in part compensate for periodic noise that is not filtered by the filter.

15. The communication end device of claim 12 wherein adjustment of the relative offset of the current signal sample is performed to at least in part compensate for periodic noise arising in the timestamps.

16. The communication end device of claim 14 wherein the periodic noise arises from noise in the timestamps.

* * * * *